US011853712B2

(12) United States Patent
Qi et al.

(10) Patent No.: US 11,853,712 B2
(45) Date of Patent: Dec. 26, 2023

(54) CONVERSATIONAL AI WITH MULTI-LINGUAL HUMAN CHATLOGS

(71) Applicant: INTERNATIONAL BUSINESS MACHINES CORPORATION, Armonk, NY (US)

(72) Inventors: Haode Qi, Cambridge, MA (US); Lin Pan, Acton, MA (US); Abhishek Shah, Jersey City, NJ (US); Ladislav Kunc, Cambridge, MA (US); Saloni Potdar, Arlington, MA (US)

(73) Assignee: International Business Machines Corporation, Armonk, NY (US)

(\*) Notice: Subject to any disclaimer, the term of this patent is extended or adjusted under 35 U.S.C. 154(b) by 285 days.

(21) Appl. No.: 17/303,728

(22) Filed: Jun. 7, 2021

(65) Prior Publication Data

US 2022/0391600 A1    Dec. 8, 2022

(51) Int. Cl.
*G06F 40/58* (2020.01)
*G06F 40/35* (2020.01)
*H04L 51/02* (2022.01)
*G06N 20/00* (2019.01)
(Continued)

(52) U.S. Cl.
CPC ............ *G06F 40/58* (2020.01); *G06F 18/214* (2023.01); *G06F 40/35* (2020.01); *G06F 40/44* (2020.01); *G06N 20/00* (2019.01); *H04L 51/02* (2013.01)

(58) Field of Classification Search
CPC ........ G06F 18/00; G06F 18/214; G06F 40/00; G06F 40/58; G06F 40/35; G06F 40/44; G06N 20/00; H04L 51/00; H04L 51/02
See application file for complete search history.

(56) References Cited

U.S. PATENT DOCUMENTS 7,249,012 B2    7/2007   Moore
9,779,085 B2   10/2017   Wick
10,657,332 B2   5/2020   Zhang
(Continued)

OTHER PUBLICATIONS

Yang, Zonghan, Yong Cheng, Yang Liu, and Maosong Sun. "Reducing Word Omission Errors in Neural Machine Translation: A Contrastive Learning Approach." In Proceedings of the 57th Annual Meeting of the Association for Computational Linguistics, pp. 6191-6196. 2019. (Year: 2019).*

(Continued)

*Primary Examiner* — Daniel C Washburn
*Assistant Examiner* — Sean E Serraguard
(74) *Attorney, Agent, or Firm* — Kenneth Han; Lily Neff (57) ABSTRACT

A method, computer system, and computer program product for multi-lingual chatlog training are provided. The embodiment may include receiving, by a processor, a plurality of data related to conversational data in multiple languages. The embodiment may also include assigning an intent label to each conversational data. The embodiment may further include assigning a language label to each conversational data. The embodiment may also include paring the plurality of the data related to the conversational data according to the intent label and the language label. The embodiment may further include training a machine learning model using a multi-lingual and multi-intent conversational data pairing. The embodiment may also include training the machine learning model using a single language and multi-intent conversational data paring.

20 Claims, 6 Drawing Sheets

(51) Int. Cl.
*G06F 40/44* (2020.01)
*G06F 18/214* (2023.01)

(56) References Cited

U.S. PATENT DOCUMENTS

| | | | |
|---|---|---|---|
| 2011/0295857 | A1 | 12/2011 | Aw |
| 2016/0260029 | A1 | 9/2016 | Gelfenbeyn |
| 2016/0350288 | A1 | 12/2016 | Wick |
| 2018/0314689 | A1* | 11/2018 | Wang .................. G10L 15/1822 |
| 2020/0097554 | A1 | 3/2020 | Rezagholizadeh |
| 2020/0184158 | A1* | 6/2020 | Kuczmarski ........... G06N 20/00 |
| 2020/0335083 | A1 | 10/2020 | Wan |
| 2021/0334299 | A1* | 10/2021 | Sonntag ................. G06N 20/00 |

OTHER PUBLICATIONS

Catapang, et al., "A Bilingual Chatbot Using Support Vector Classifier on an Automatic Corpus Engine Dataset", ICAIIC 2020, IEEE Xplore, accessed Mar. 25, 2021, pp. 187-192.

Chen, et al., "A Simple Framework for Contrastive Learning of Visual Representations," arXiv:2002.05709v3 [cs.LG], Jul. 1, 2020, pp. 1-20.

Devlin, "Bert: Pre-training of Deep Bidirectional Transformers for Language Understanding," arXiv: 1810.04805v2 [cs.CL], May 24, 2019, pp. 1-6.

Duan, et al., "Bilingual Semantic Network Construction", ICIC 2005, Spring-Verlag, 2005, pp. 548-557.

Fang, et al., "CERT: Contrastive Self-supervised Learning for Language Understanding," arXiv:2005.12766v2 [cs.CL], Jun. 18, 2020, pp. 1-16.

Hao, et al., "Robust Spoken Language Understanding with Acoustic and Domain Knowledge", ICMI '19, Association for Computing Machinery, Oct. 14-18, 2019, pp. 531-535.

Hu, "Xtreme: A Massively Multilingual Multi-Task Benchmark for Evaluating Cross-Lingual Generalization," arXiv:2003.11080v5 [cs.CL] Sep. 4, 2020 pp. 1-20.

Masumura, et al., "Adversarial Training for Multi-task and Multi-lingual Joint Modeling of Utterance Intent Classification", Proceedings of the 2018 Conf. Empirical Methods in Natural Language Processing, Oct. 31-Nov. 4, 2018, pp. 633-639.

Mell et al., "The NIST Definition of Cloud Computing," National Institute of Standards and Technology, Special Publication 800-145, Sep. 2011, pp. 1-7.

Wang, et al., "A New Two-Layer Approach for Spoken Language Translation," ISCSLP 2004, IEEE Xplore, accessed Mar. 25, 2021, pp. 321-324.

Wu, C. H. et al., "Speech Act Identification Using An Ontology-Based Partial Pattern Tree," Researchgate, Jan. 2004, pp. 1-5.

* cited by examiner

CONVERSATIONAL AI WITH MULTI-LINGUAL HUMAN CHATLOGS

BACKGROUND

The present invention relates, generally, to the field of computing, and more particularly to chatbot systems.

A chatbot is artificial intelligence (AI) software that can simulate a conversation or a chat with a user in natural language through messaging applications, websites, mobile apps, or the telephone. Most chatbots are accessed online via website pop-ups or through virtual assistants. Chatbots are used in dialog systems for various purposes including customer service, request routing, or information gathering. Many chatbot applications utilize word-classification processes, natural language processors, and sophisticated AI. Formulating responses to questions in natural language is one of the typical examples of natural language processing techniques applied in many chatbots uses. As chatbots can efficiently conduct a dialogue, they may replace other communication tools such as email, phone, or SMS. For example, in banking industries, chatbots are used quick customer service answering common requests, as well as transactional support. According to studies, chatbots may bring about a significant reduction in the cost of customer services. Another advantage of chatbots is that chatbots can attend to customers at all times of the day and week regardless of physical locations.

SUMMARY

According to one embodiment, a method, computer system, and computer program product for multi-lingual chatlog training are provided. The embodiment may include receiving, by a processor, a plurality of data related to conversational data in multiple languages. The embodiment may also include assigning an intent label to each conversational data. The embodiment may further include assigning a language label to each conversational data. The embodiment may also include paring the plurality of the data related to the conversational data according to the intent label and the language label. The embodiment may further include training a machine learning model using a multi-lingual and multi-intent conversational data pairing. The embodiment may also include training the machine learning model using a single language and multi-intent conversational data paring.

BRIEF DESCRIPTION OF THE SEVERAL VIEWS OF THE DRAWINGS

These and other objects, features, and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to chatbot systems. The following described exemplary embodiments provide a system, method, and program product to receive conversational data pieces comprising multiple languages, train a machine learning model using multi-lingual and multi-intent conversational data paring and provide a multi-lingual chatlog according to the trained machine learning model. Therefore, the present embodiment has the capacity to improve the technical field of chatbot systems by improving multi-lingual chatbot without relying upon users to create large parallel language data.

As previously described, a chatbot is artificial intelligence (AI) software that can simulate a conversation or a chat with a user in natural language through messaging applications, websites, mobile apps, or the telephone. Most chatbots are accessed online via website pop-ups or through virtual assistants. Chatbots are used in dialog systems for various purposes including customer service, request routing, or information gathering. Many chatbot applications utilize word-classification processes, natural language processors, and sophisticated AI. Formulating responses to questions in natural language is one of the typical examples of natural language processing techniques applied in many chatbots uses. As chatbots can efficiently conduct a dialogue, they may replace other communication tools such as email, phone, or SMS. For example, in banking industries, chatbots are used quick customer service answering common requests, as well as transactional support. According to studies, chatbots may bring about a significant reduction in the cost of customer services. Another advantage of chatbots is that chatbots can attend to customers at all times of the day and week regardless of physical locations.

Modern chatbot services are evolving from monolingual chatbots to a multi-lingual chatbots. Many organizations seek to expand their existing monolingual chatbots to handle other languages for business purposes without the need to design a new chatbot. Currently, open-source multi-lingual models are trained with formal languages that are not suitable for handling human chatlogs that are oftentimes noisy. Moreover, open-source parallel data for chatbots related to different languages are highly abundant in languages like English but much less for other less popular languages. Even English-related data is often in the format of formal languages as opposed to everyday languages. Clients such as companies or other types of organizations usually have limited parallel data for building a multilingual chatbot. As such, it may be advantageous to, among other things, implement a system capable of improving multi-lingual chatbots without building or collecting large parallel language data for different languages other than English.

According to one embodiment, the present invention may receive conversational data information in multiple languages and assign an intent label to each conversational data. In at least one embodiment, the present invention may also determine and assign a language label to each conversational data. The present invention may further train a machine learning model using multi-lingual and multi-intent conversational data paring so that it may create a multi-lingual chatlog according to the trained machine learning model.

The present invention may be a system, a method, and/or a computer program product at any possible technical detail level of integration. The computer program product may include the computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer-readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or another device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product for improving conversational artificial intelligence with multi-lingual human chatlogs based on training a machine learning model.

Figure 1:
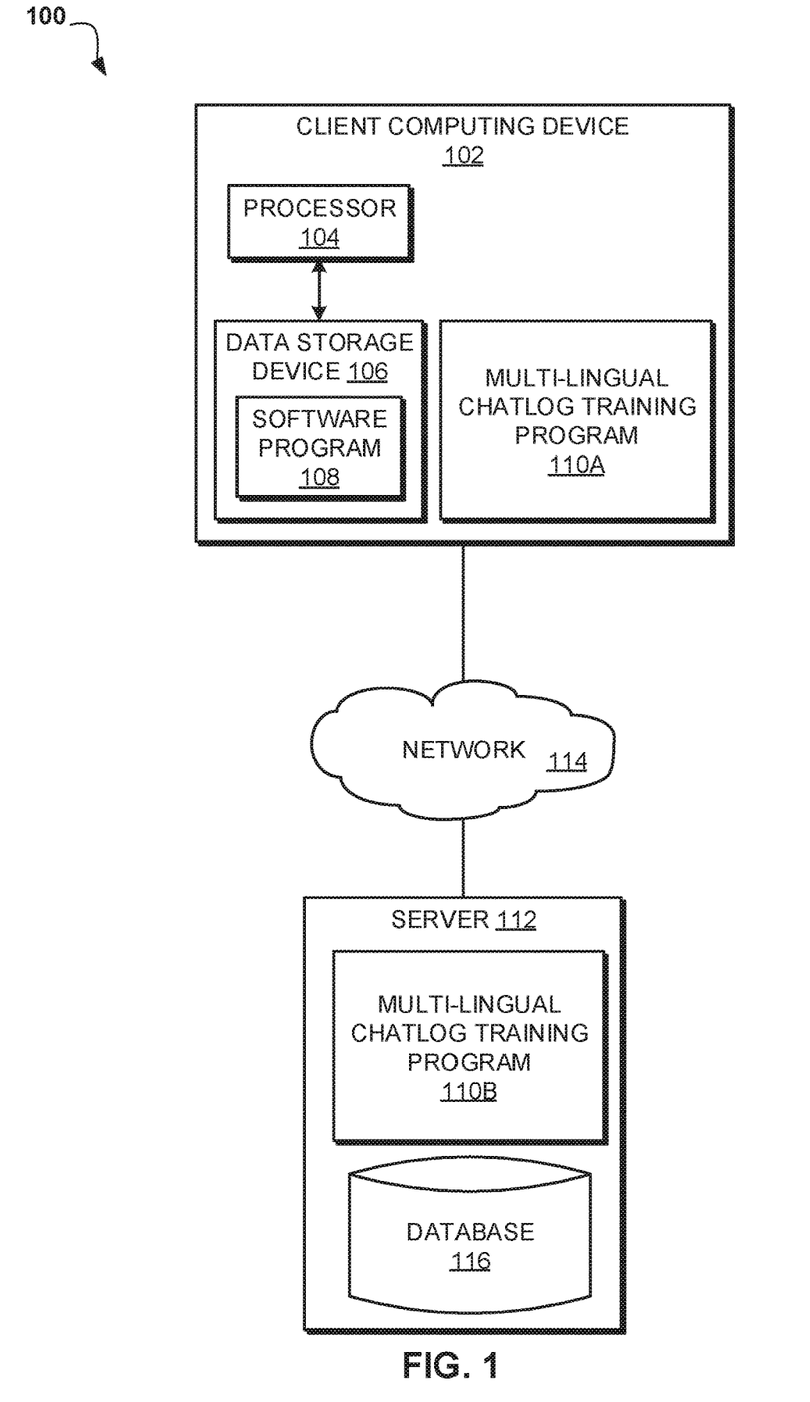
FIG. 1 illustrates an exemplary networked computer environment according to at least one embodiment.

Referring to FIG. 1, an exemplary networked computer environment 100 is depicted, according to at least one embodiment. The networked computer environment 100 may include client computing device 102 and a server 112 interconnected via a communication network 114. According to at least one implementation, the networked computer environment 100 may include a plurality of client computing devices 102 and servers 112 of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and a multi-lingual chatlog training program 110A and communicate with the server 112 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 4, the client computing device 102 may include internal components 402a and external components 404a, respectively.

The server computer 112 may be a laptop computer, netbook computer, personal computer (PC), a desktop computer, or any programmable electronic device or any network of programmable electronic devices capable of hosting and running a multi-lingual chatlog training program 110B and a database 116 and communicating with the client computing device 102 via the communication network 114, in accordance with embodiments of the invention. As will be discussed with reference to FIG. 4, the server computer 112 may include internal components 402b and external components 404b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

According to the present embodiment, the multi-lingual chatlog training program 110A, 110B may be a program capable of receiving conversational data information in multiple languages and assign an intent label to each conversational data. In at least one embodiment, the multi-lingual chatlog training program 110A, 110B may determine and assign a language label to each conversational data. In another embodiment, the multi-lingual chatlog training program 110A, 110B may train a machine learning model using multi-lingual and multi-intent conversational data paring. In yet another embodiment, the multi-lingual chatlog training program 110A, 110B may train a machine learning method using a single language and multi-intent conversational data parings. In at least one other embodiment, the multi-lingual chatlog training program 110A, 110B may generate a multi-lingual chatlog according to the trained machine learning model. The multi-lingual chatlog training process is explained in further detail below with respect to FIG. 3.

Figure 2:
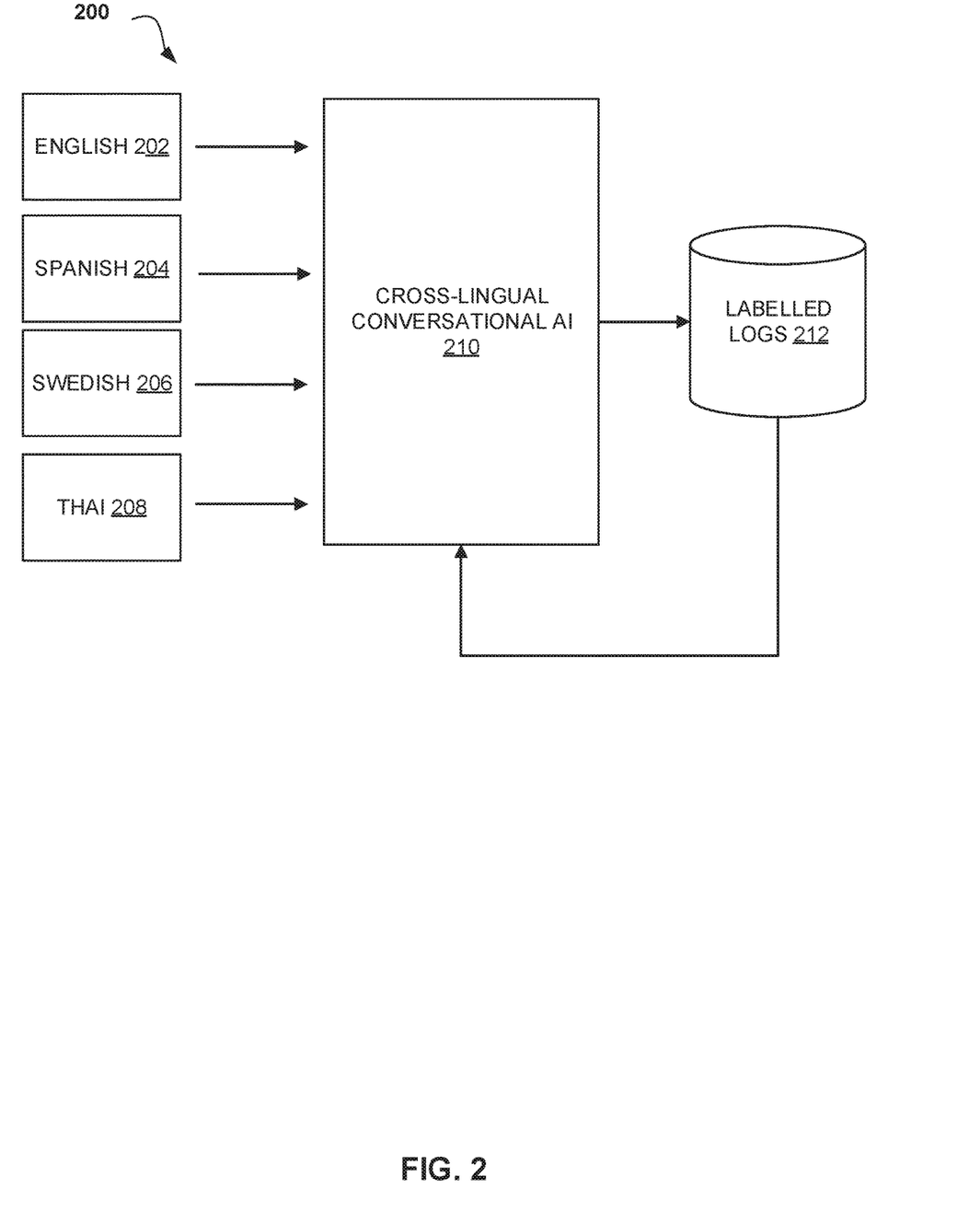
FIG. 2 is a functional block diagram of a multi-lingual chatlog training platform according to at least one embodiment.

Referring now to FIG. 2, a functional block diagram of a multi-lingual chatlog training process 200 is depicted according to at least one embodiment. According to one embodiment, the multi-lingual chatlog training program 110A, 110B may consist of a cross-lingual conversational AI 210 and a database, the labeled logs 212. Cross-lingual conversational AI 210 may receive inputs from users that use different languages. In at least one embodiment, the multi-lingual chatlog training program 110A, 110B may receive input information in different languages and detect different languages, for example, consisting of English 202, Spanish 204, Swedish 206, and Thai 208. After each chat session with a user, the multi-lingual chatlog training program 110A, 110B may generate weakly labeled logs that may map each input to an intent. In at least one another embodiment, the multi-lingual chatlog training program 110A, 110B may train the cross-lingual conversational AI 210 to learn to output a similar confidence score for the input information that has been mapped to the same conversational intent.

Figure 3:
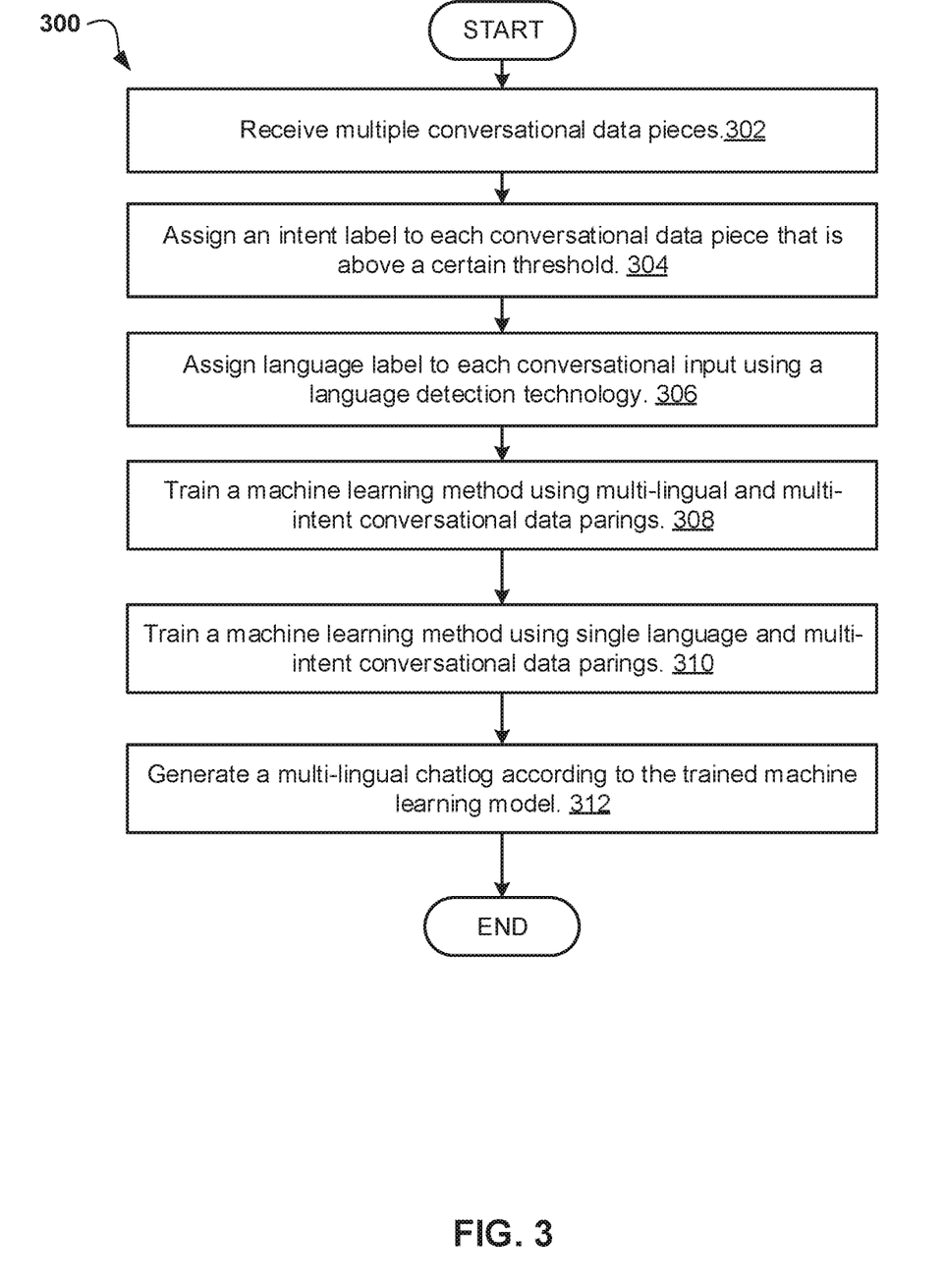
FIG. 3 is an operational flowchart illustrating a multi-lingual chatlog training process according to at least one embodiment.

FIG. 3 is an operational flowchart illustrating a multi-lingual chatlog training process 300 according to at least one embodiment. At 302, the multi-lingual chatlog training program 110A, 110B receives multiple conversational data pieces. According to one embodiment, the multi-lingual chatlog training program 110A, 110B may receive input from a plurality of users that may use different languages. For example, the multi-lingual chatlog training program 110A, 110B may receive user chat messages inquiring whether a hotel is available on a particular date with the intent to book a hotel for vacation in different languages such as English, Spanish, Arabic, Japanese, French, Thai, etc. The multi-lingual chatlog training program 110A, 110B may determine which language each user is trying to communicate in and save the communications in logs for each user or each communication.

At 304, the multi-lingual chatlog training program 110A, 110B assigns an intent label to each conversational data piece that is above a certain threshold. According to one embodiment, the multi-lingual chatlog training program 110A, 110B may utilize language detection algorithms to detect a particular language of human chatlogs and group those into contrastive pairs based on weakly labeled intent generated using an already existing classifier. For example, each chatlog is analyzed and grouped into different intent such as booking a hotel, searching for a restaurant, requesting a service call, etc. In at least one embodiment, the multi-lingual chatlog training program 110A, 110B may analyze multiple languages and classify them into different intent as shown in the exemplary table below.

TABLE 1

<Exemplary Classification of Multiple Languages>

| Original Data | Intent 1 | Intent 2 | Intent 3 |
|---|---|---|---|
| Language 1 | 10 logs | 5 logs | 13 logs |
| Language 2 | 15 logs | 3 logs | 12 logs |
| Language 3 | 4 logs | 2 logs | 3 logs |

Each column of the above table may represent different intent with which each user communicated with a chatbot in different languages. For example, Intent 1 may represent "booking a hotel" and the multi-lingual chatlog training program 110A, 110B may have determined that there have been 10 logs communicated in Language 1 or English and 5 logs in English for Intent 2 (e.g., finding a near-by restaurant) and 13 logs in English for Intent 3 (e.g., requesting a service call). As shown in the above table, Language 3 may be a minority or underrepresented language that may not be widely spoken in a particular country, and therefore the multi-lingual chatlog training program 110A, 110B may have detected significantly fewer number of logs compared to Language 1.

At 306, the multi-lingual chatlog training program 110A, 110B utilizes a language detection technology to assign language labels to each input. Although certain languages may have more training examples and inputs than the other, the multi-lingual chatlog training program 110A, 110B may utilize the resource of popular language to help the training of the chatbot on under-represented languages. In at least one other embodiment, the multi-lingual chatlog training program 110A, 110B may pair popular language with an under-represented language to train a machine learning model in later steps.

At 308, the multi-lingual chatlog training program 110A, 110B trains a machine learning method using multi-lingual and multi-intent conversational data parings. According to one embodiment, the multi-lingual chatlog training program 110A, 110B may determine the number of logs for an under-resourced language from the exemplary table 1 above and multiply it by the number of logs for the more popular languages as shown in the table below.

TABLE 2

<Exemplary Contrastive Data Pairs for Under-resourced Language>

| Contrastive Data Pairs for Language 3 | Intent 1 | Intent 2 | Intent 3 |
|---|---|---|---|
| Language1/ Language3 | 10 × 4 = 40 logs | 5 × 2 = 10 logs | 13 × 3 = 39 logs |
| Language2/ Language3 | 15 × 4 = 60 logs | 3 × 2 = 6 logs | 12 × 3 = 26 logs |

In the table 2 above, although Language 3 only has 4 logs in Intent 1, there are 10 logs from Language 1 in Intent 1 that can be treated as a paraphrases or inputs that carry similar meanings. Cross lingual contrastive learning may require the ground-truth pair to be a sentence that carries the same meaning but in different languages. Since Language 1 & 2 are much better represented in the data, the multi-lingual chatlog training program 110A, 110B may effectively aligning Language 3 to Language 1 & 2.

In at least one other embodiment, the multi-lingual chatlog training program 110A, 110B may perform contrastive learning of multi-lingual analysis and multi-intent analysis to align language understandings of under-resourced languages to popular languages. In yet another embodiment, the multi-lingual chatlog training program 110A, 110B may compute said contrastive learning based on the following formula:

$$L_1 = -\log \frac{\exp(logit_i, logit_{i'})}{\sum \exp(logit_i, logit_k)} k \notin I$$

In the above formula, $logit_i$, $logit_{i'}$ are classifier representations for the same intent set I but with different languages. The contrastive pairs are $logit_i$, $logit_k$ where k is from a different intent. For instance, $logit_i$ may represent an intent for "book flight" and a sentence which the multi-lingual chatlog training program 110A, 110B received as input may read "Can I book a flight?" in English. $logit_{i'}$ may represent the same intent and/or the same sentence in a different language (e.g. puis-je réserver un vol). To compute L1 in the above formula, $logit_k$ may represent a different language with a different intent such as "Can I make a reservation in Boston for May 15$^{th}$?" or "puis-je faire une réservation à boston?". During a machine learning model training, L1 may be used as an additional task to existing objective function.

At 310, the multi-lingual chatlog training program 110A, 110B trains a machine learning model using a single language and multi-intent conversational data parings. According to one embodiment, the multi-lingual chatlog training program 110A, 110B may perform contrastive learning of mono-lingual vs. multi-intent to disambiguate intents within the same language. In one embodiment, the multi-lingual chatlog training program 110A, 110B may perform the contrastive learning of a single language with multiple intents using the following formula:

$$L_2 = -\log \frac{\exp(logit_i, logit_{i'})}{\sum \exp(logit_i, logit_k)} k \notin I$$

In the above formula, $logit_i$, $logit_{i'}$ are classifier representations for the same intent set I. The contrastive pairs are $logit_i$, $logit_k$ where k may be from a different intent. For example, $logit_i$ may represent a chatlog, "Can I book a flight?" and $logit_{i'}$ may represent a chatlog, "Can I book a flight for tomorrow?" Both chatlogs may be related to booking a flight but the latter sentence may contain an additional intent, "for tomorrow". $logit_k$ may represent a chatlog, "Can I make a reservation in Boston for May 15th?" which has a different intent, and it may be represented in a different way of saying, "I need to make a reservation for tonight". In yet another embodiment, the multi-lingual chatlog training program 110A, 110B may obtain a value "L" based on a sum of multiplication of coefficients by L1 and L2, respectively, as shown in the following formula:

$$L = \alpha L_1 + \beta L_2$$

In at least one embodiment, the above function may be used as a loss function during computing a gradient descent of the model training.

At 312, the multi-lingual chatlog training program 110A, 110B generates a multi-lingual chatlog according to the trained machine learning model. According to one other embodiment, the multi-lingual chatlog training program 110A, 110B may expand a monolingual chatbot to handle other languages without the need to design a new bot by automatically training a model using a machine learning model described above.

It may be appreciated that FIGS. 2-3 provide only an illustration of one implementation and do not imply any limitations with regard to how different embodiments may be implemented. Many modifications to the depicted environments may be made based on design and implementation requirements. For example, in at least one embodiment, the multi-lingual chatlog training program 110A, 110B may perform multi-lingual vs multi-intent contrastive learning and mono-lingual vs multi-intent contrastive learning together as a multi-task learning framework, which may be performed periodically to improve a multi-lingual chatbot.

Figure 4:
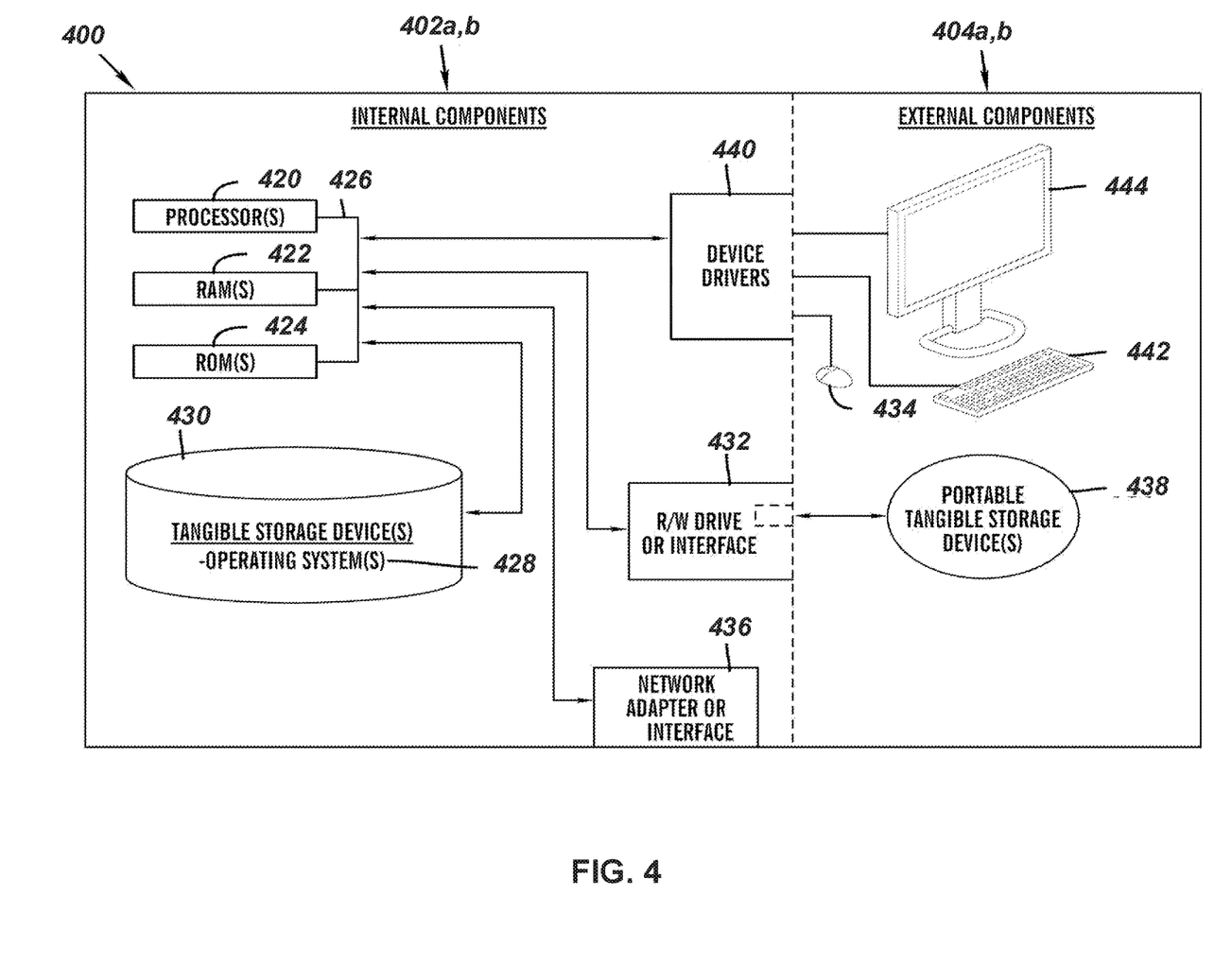
FIG. 4 is a block diagram of internal and external components of computers and servers depicted in FIG. 1 according to at least one embodiment.

FIG. 4 is a block diagram 400 of internal and external components of the client computing device 102 and the server 112 depicted in FIG. 1 in accordance with an embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

The data processing system 402, 404 is representative of any electronic device capable of executing machine-readable program instructions. The data processing system 402, 404 may be representative of a smart phone, a computer system, PDA, or other electronic devices. Examples of computing systems, environments, and/or configurations that may represented by the data processing system 402, 404 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 402a,b and external components 404a,b illustrated in FIG. 4. Each of the sets of internal components 402 include one or more processors 420, one or more computer-readable RAMs 422, and one or more computer-readable ROMs 424 on one or more buses 426, and one or more operating systems 428 and one or more computer-readable tangible storage devices 430. The one or more operating systems 428, the software program 108 and the multi-lingual chatlog training program 110A in the client computing device 102 and the multi-lingual chatlog training program 110B in the server 112 are stored on one or more of the respective computer-readable tangible storage devices 430 for execution by one or more of the respective processors 420 via one or more of the respective RAMs 422 (which typically include cache memory). In the embodiment illustrated in FIG. 4, each of the computer-readable tangible storage devices 430 is a magnetic disk storage device of an internal hard drive. Alternatively, each of the computer-readable tangible storage devices 430 is a semiconductor storage device such as ROM 424, EPROM, flash memory or any other computer-readable tangible storage device that can store a computer program and digital information.

Each set of internal components 402a,b also includes an R/W drive or interface 432 to read from and write to one or more portable computer-readable tangible storage devices 438 such as a CD-ROM, DVD, memory stick, magnetic tape, magnetic disk, optical disk or semiconductor storage device. A software program, such as the multi-lingual chatlog training program 110A, 110B can be stored on one or more of the respective portable computer-readable tangible storage devices 438, read via the respective R/W drive or interface 432 and loaded into the respective hard drive 430.

Each set of internal components 402a,b also includes network adapters or interfaces 436 such as a TCP/IP adapter cards, wireless Wi-Fi interface cards, or 3G or 4G wireless interface cards or other wired or wireless communication links. The software program 108 and the multi-lingual chatlog training program 110A in the client computing device 102 and the multi-lingual chatlog training program 110B in the server 112 can be downloaded to the client computing device 102 and the server 112 from an external computer via a network (for example, the Internet, a local area network or other, wide area network) and respective network adapters or interfaces 436. From the network adapters or interfaces 436, the software program 108 and the multi-lingual chatlog training program 110A in the client computing device 102 and the multi-lingual chatlog training program 110B in the server 112 are loaded into the respective hard drive 430. The network may comprise copper wires, optical fibers, wireless transmission, routers, firewalls, switches, gateway computers and/or edge servers.

Each of the sets of external components 404a,b can include a computer display monitor 444, a keyboard 442, and a computer mouse 434. External components 404a,b can also include touch screens, virtual keyboards, touch pads, pointing devices, and other human interface devices. Each of the sets of internal components 402a,b also includes device drivers 440 to interface to computer display monitor 444, keyboard 442, and computer mouse 434. The device drivers 440, R/W drive or interface 432, and network adapter or interface 436 comprise hardware and software (stored in storage device 430 and/or ROM 424).

It is understood in advance that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is a service oriented with a focus on statelessness, low coupling, modularity, and semantic interoperability. At the heart of cloud computing is an infrastructure comprising a network of interconnected nodes.

Figure 5:
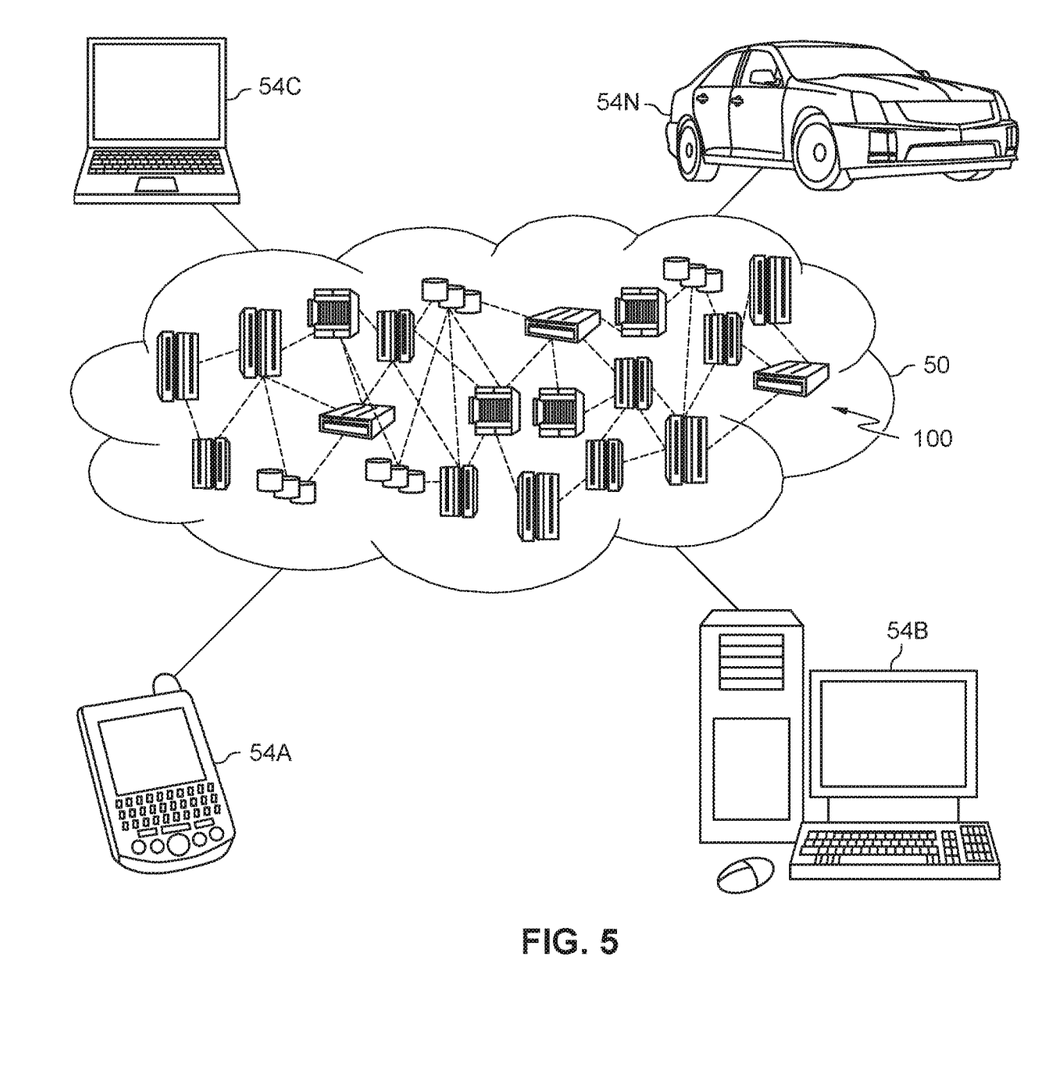
FIG. 5 depicts a cloud computing environment according to an embodiment of the present invention.

Referring now to FIG. 5, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 100 and cloud computing environment 50 can communicate with any type of computerized device over any type of network and/or network addressable connection (e.g., using a web browser).

Figure 6:
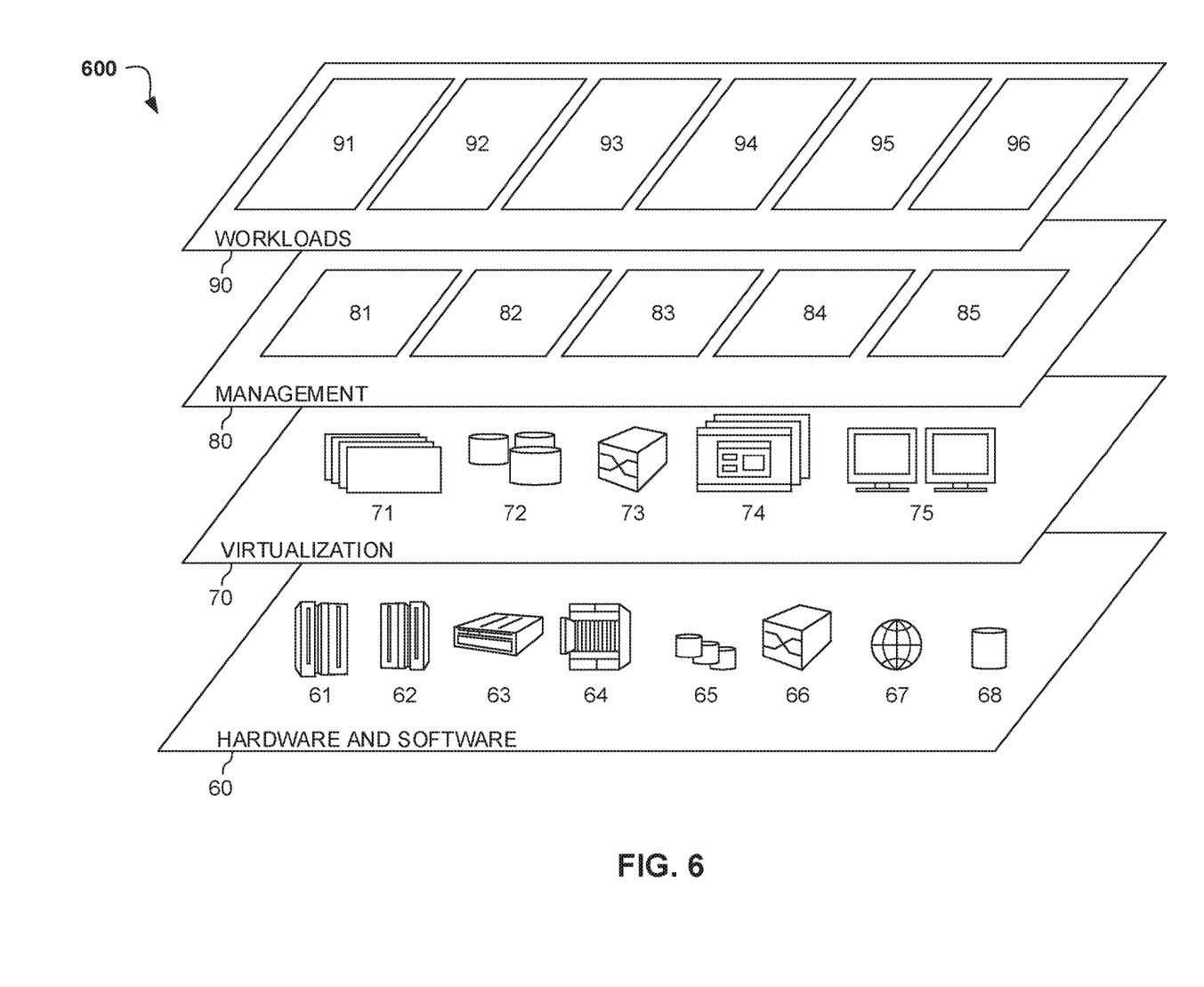
FIG. 6 depicts abstraction model layers according to an embodiment of the present invention.

Referring now to FIG. 6, a set of functional abstraction layers 600 provided by cloud computing environment 50 is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and multi-lingual chatlog training process 96. Multi-lingual chatlog training process 96 may relate to improving language understanding of multilingual chatbots with human chatlogs.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for multi-lingual chatlog training, the method comprising:
    receiving, by a processor, a plurality of data related to conversational data in multiple languages concurrently;
    assigning an intent label to each conversational data;
    assigning a language label to each conversational data;
    analyzing each piece of said conversational data based on available information including stored data logs, and dividing said pieces into a first group and a second group, wherein the first group comprises pieces of conversational data in at least a first language and a second language, wherein the second group comprises pieces of conversational data in at least a third language, and wherein the first group has more information and available data logs for the first language and the second language than the second group has for the third language;
    pairing each piece in said second group with at least a piece in said first group, wherein said pairing is made based on similarity of said pieces;
        said similarity being determined based on existing classifiers obtained from available information and said stored data logs, wherein said pairing is made using contrastive learning models based on the pieces of the conversational data in the first language, the second language, and the third language according to the intent label and the language label;
    storing the pairings so as to provide each piece of said conversational data of said second group with a piece of said conversational data of said first group;
    training a machine learning model using said pairings to provide a translation between the multiple languages in a multi-lingual and multi-intent conversational data pairing, wherein the machine learning model is also trained using a single language and multi-intent conversational data pairing;
    and providing a multi-lingual chatlog according to the trained machine learning model.

2. The method of claim 1, wherein the assigning the intent label comprises assigning the intent label according to a confidence threshold.

3. The method of claim 1, wherein the assigning the language label comprises assigning the language label according to a confidence threshold.

4. The method of claim 1, wherein the machine learning model using the multi-lingual and multi-intent conversational data pairing and the machine learning model using the single language and multi-intent conversational data pairing are trained together.

5. The method of claim 2, wherein the confidence threshold for an under-represented language is not adjusted.

6. The method of claim 3, wherein the confidence threshold for an under-represented language is not adjusted.

7. The method of claim 1, further comprising:
    determining a language used by a user for a given session of a conversational chat using a language detection technology.

8. A computer system for multi-lingual chatlog training, the computer system comprising:
    one or more processors, one or more computer-readable memories, one or more computer-readable tangible storage media, and program instructions stored on at least one of the one or more tangible storage media f or execution by at least one of the one or more processors via at least one of the one or more memories, wherein the computer system is capable of performing a method comprising:
    receiving, by a processor, a plurality of data related to conversational data in multiple languages concurrently;
    assigning an intent label to each conversational data;
    assigning a language label to each conversational data;
    analyzing each piece of said conversational data based on available information including stored data logs, and dividing said pieces into a first group and a second group, wherein the first group comprises pieces of conversational data in at least a first language and a second language, wherein the second group comprises pieces of conversational data in at least a third language, and wherein the first group has more information and available data logs for the first language and the second language than the second group has for the third language;
    pairing each piece in said second group with at least a piece in said first group, wherein said pairing is made based on similarity of said pieces;
        said similarity being determined based on existing classifiers obtained from available information and said stored data logs, wherein said pairing is made using contrastive learning models based on the pieces of the conversational data in the first language, the second language, and the third language according to the intent label and the language label;
    storing the pairings so as to provide each piece of said conversational data of said second group with a piece of said conversational data of said first group;
    training a machine learning model using said pairings to provide a translation between the multiple languages in a multi-lingual and multi-intent conversational data pairing, wherein the machine learning model is also trained using a single language and multi-intent conversational data pairing;
    and providing a multi-lingual chatlog according to the trained machine learning model.

9. The computer system of claim 8, wherein the assigning the intent label comprises assigning the intent label according to a confidence threshold.

10. The computer system of claim 8, wherein the assigning the language label comprises assigning the language label according to a confidence threshold.

11. The computer system of claim 8, wherein the machine learning model using the multi-lingual and multi-intent conversational data pairing and the machine learning model using the single language and multi-intent conversational data pairing are trained together.

12. The computer system of claim 9, wherein the confidence threshold for an under-represented language is not adjusted.

13. The computer system of claim 10, wherein the confidence threshold for an under-represented language is not adjusted.

14. The computer system of claim 8, further comprising: determining a language used by a user for a given session of a conversational chat using a language detection technology.

15. A computer program product for multi-lingual chatlog training, the computer program product comprising:
one or more computer-readable tangible storage media and program instructions stored on at least one of the one or more tangible storage media, the program instructions executable by a processor of a computer to perform a method, the method comprising:
receiving, by a processor, a plurality of data related to conversational data in multiple languages concurrently;
assigning an intent label to each conversational data;
assigning a language label to each conversational data;
analyzing each piece of said conversational data based on available information including stored data logs, and dividing said pieces into a first group and a second group, wherein the first group comprises pieces of conversational data in at least a first language and a second language, wherein the second group comprises pieces of conversational data in at least a third language, and wherein the first group has more information and available data logs for the first language and the second language than the second group has for the third language;
pairing each piece in said second group with at least a piece in said first group, wherein said pairing is made based on similarity of said pieces; said similarity being determined based on existing classifiers obtained from available information and said stored data logs, wherein said pairing is made using contrastive learning models based on the pieces of the conversational data in the first language, the second language, and the third language according to the intent label and the language label;
storing the pairings so as to provide each piece of said conversational data of said second group with a piece of said conversational data of said first group;
training a machine learning model using said pairings to provide a translation between the multiple languages in a multi-lingual and multi-intent conversational data pairing, wherein the machine learning model is also trained using a single language and multi-intent conversational data pairing;
and providing a multi-lingual chatlog according to the trained machine learning model.

16. The computer program product of claim 15, wherein the assigning the intent label comprises assigning the intent label according to a confidence threshold.

17. The computer program product of claim 15, wherein the assigning the language label comprises assigning the language label according to a confidence threshold.

18. The computer program product of claim 15, wherein the machine learning model using the multi-lingual and multi-intent conversational data pairing and the machine learning model using the single language and multi-intent conversational data pairing are trained together.

19. The computer program product of claim 16, wherein the confidence threshold for an under-represented language is not adjusted.

20. The computer program product of claim 17, wherein the confidence threshold for an under-represented language is not adjusted.

* * * * *